US006969926B2

(12) United States Patent  
Conlon

(10) Patent No.: US 6,969,926 B2
(45) Date of Patent: Nov. 29, 2005

(54) MECHANISM FOR CONVERTING MECHANICAL ENERGY FOR WIND POWERED ENERGY SYSTEMS

(76) Inventor: Thomas R. Conlon, P.O. Box 12012, Honolulu, HI (US) 96828

( * ) Notice: Subject to any disclaimer, the term of this patent is extended or adjusted under 35 U.S.C. 154(b) by 73 days.

(21) Appl. No.: 10/861,774

(22) Filed: Jun. 3, 2004

(65) Prior Publication Data

US 2005/0225092 A1    Oct. 13, 2005

Related U.S. Application Data

(60) Provisional application No. 60/476,118, filed on Jun. 4, 2003.

(51) Int. Cl.$^7$ ................................................ F03D 9/00
(52) U.S. Cl. ........................... 290/55; 290/43; 290/44; 290/54; 290/53; 290/1 R
(58) Field of Search ............................. 290/55, 54, 43, 290/44, 53, 1 R

(56) References Cited

U.S. PATENT DOCUMENTS

| | | | | | |
|---|---|---|---|---|---|
| 5,982,046 | A | * | 11/1999 | Minh | ........................ 290/55 |
| 6,249,057 | B1 | * | 6/2001 | Lehet | ........................ 290/1 R |
| 6,320,273 | B1 | * | 11/2001 | Nemec | ........................ 290/55 |
| 6,664,655 | B2 | * | 12/2003 | Vann | ........................ 290/55 |
| 6,838,782 | B2 | * | 1/2005 | Vu | ........................ 290/55 |

* cited by examiner

Primary Examiner—Nicholas Ponomarenko
Assistant Examiner—Iraj A. Mohanddesi
(74) Attorney, Agent, or Firm—Leighton K. Chong

(57) ABSTRACT

An improved drive mechanism for a windmill has: (a) a drive chain driven into movement by a wind wheel shaft driven into rotation by wind movement against a wind wheel; (b) a drive chain sprocket driven by the drive chain and coupled to a force chain sprocket to correspondingly drive a force chain; (c) a chain pin coupled at one position to the force chain and also coupled to a captive slide; and (d) a pump rod connected to the slide and driven an equal distance in each direction by the driven slide in order to convert full mechanical force equally on both the full upstroke and the full downstroke of the pump rod. The improved drive mechanism improves the efficiency of the power cycle by transitioning to the full upstroke with only a minimal dwell on either end of the stroke for transition to movement in the opposite direction. Full mechanical force can thus be applied equally on both the full upstroke and the full downstroke. A high reliability oil bucket chain link lubrication system is used to flood the entire chain mechanism with abundant oil to avoid the problems in traditional pumps of loss of priming, seal wear, etc.

2 Claims, 3 Drawing Sheets

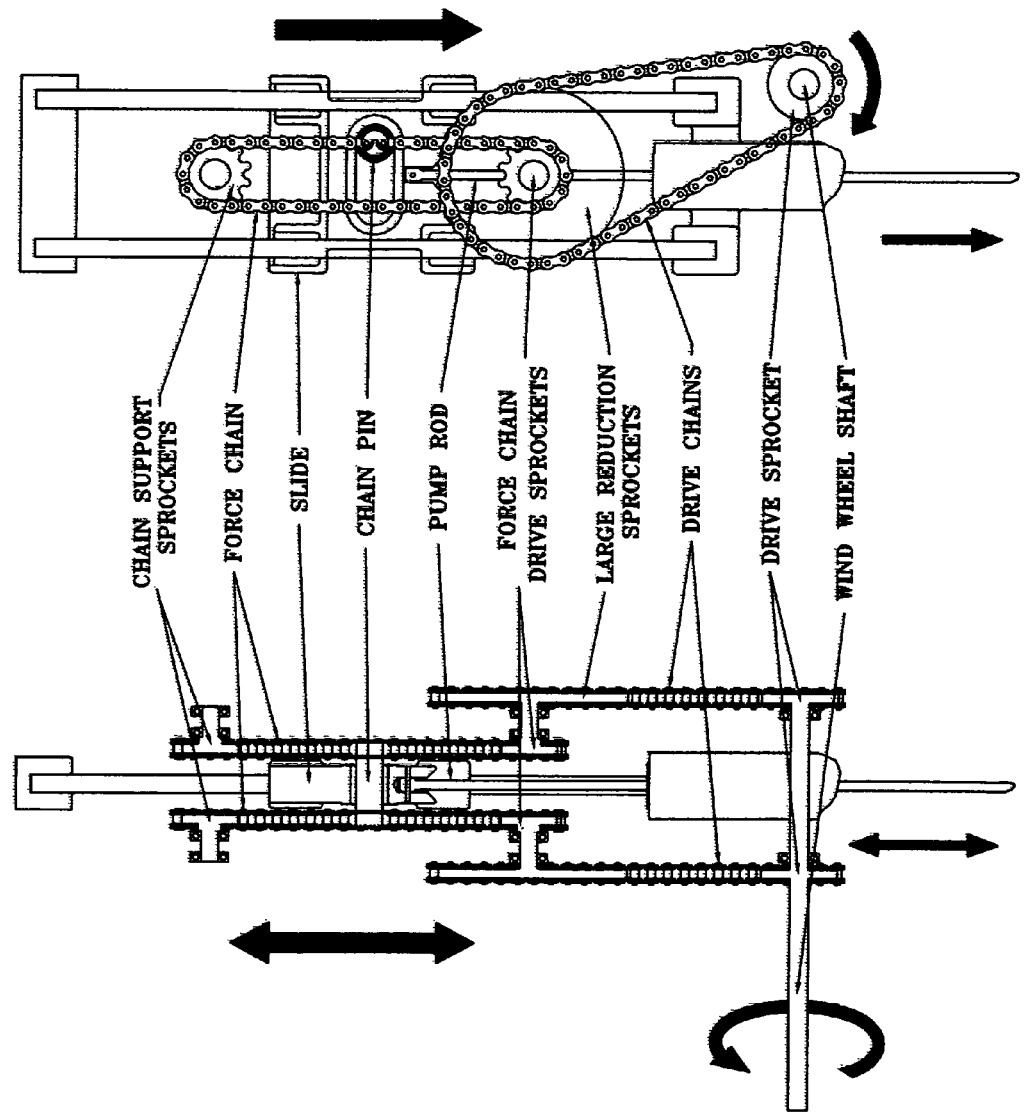

MECHANISM FOR CONVERTING MECHANICAL ENERGY FOR WIND POWERED ENERGY SYSTEMS

This U.S. patent application claims the priority of U.S. Provisional Application No. 60/476,118 filed on Jun. 4, 2003, of the same title, and by the same inventor.

TECHNICAL FIELD

This invention generally relates to an improvement in the drive mechanism for increasing the amount of work performed by the common windmill.

BACKGROUND OF INVENTION

The traditional windmill uses a gear and crank drive that allows for efficient pumping only when the crank is moving in the upward, or lifting direction. Such a pumping system is commonly known as a pump jack. This design allows minimal if any work to be done when the crank is returning to it's starting point at the bottom of the stroke, the only pumping being done at this time is by the displacement of the pump rod, which is usually, minimal. Additionally, the amount of work is significantly reduced at both the beginning of the upward stroke and the last portion of the upward stroke as the crank is nearing or departing from top dead center and bottom dead center of the stroke in both directions. This limits the most productive part of the stroke to a 90 deg. section 45 deg. up from the bottom dead center to a point 45 deg. before the top dead center of the stroke. The remaining 90 deg. portions of the upward stroke is of minimal use and the 180 deg. portion of the downward stroke is of little or no use at all. Much useful energy is wasted as a result of these deficiencies.

SUMMARY OF INVENTION

In accordance with the present invention, an improved drive mechanism for a windmill comprises:

(a) a drive chain driven into movement by a wind wheel shaft driven into rotation by wind movement against a wind wheel;

(b) a drive chain sprocket driven by the drive chain and coupled to a force chain sprocket to correspondingly drive a force chain;

(c) a chain pin coupled at one position to the force chain and also coupled to a captive slide; and (d) a pump rod connected to the slide and driven an equal distance in each direction by the driven slide in order to convert full mechanical force equally on both the full upstroke and the full downstroke of the pump rod.

The improved drive mechanism for a windmill improves the efficiency of the power cycle by transitioning to the full upstroke with only a minimal dwell on either end of the stroke for transition to movement in the opposite direction. Wind movement causes a wind wheel to rotate a shaft which drives dual drive chains into movement. The drive chain sprockets are coupled to two force chain sprockets which drive two force chains. A chain pin is coupled at one position to the force chains and also coupled to a captive slide. A pump rod is connected to the slide and driven an equal distance in each direction by the driven slide. Full mechanical force can thus be applied equally on both the full upstroke and the full downstroke. The result is the ability to put to useful work a significantly higher amount of energy on the upstroke and the full mechanical force on the downstroke as well. A high reliability oil bucket chain link lubrication system is used to flood the entire chain mechanism with abundant oil to avoid the problems in traditional pumps of loss of priming, seal wear, etc.

Other objects, features, and advantages of the present invention will be explained in the following detailed description of the invention having reference to the appended drawings.

BRIEF DESCRIPTION OF DRAWINGS

FIG. 1A shows an improved drive mechanism for a windmill in accordance with the invention in front view, and FIG. 1B show sit in side view.

DETAILED DESCRIPTION OF INVENTION

Figure 2D:
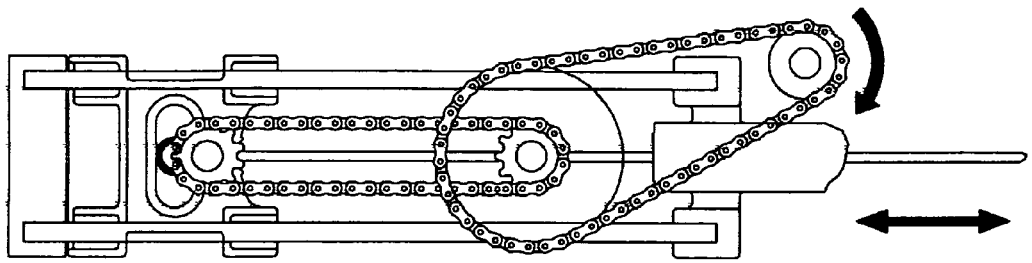
FIGS. 2A–2D show operation of the drive mechanism at different stages of a cycle.
Figure 2C:
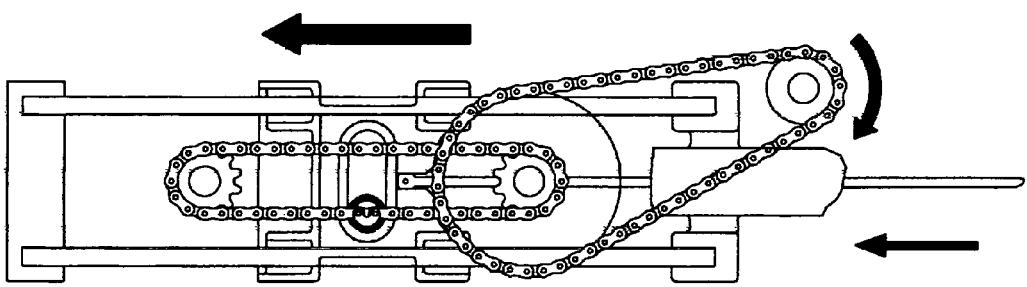
Figure 2B:
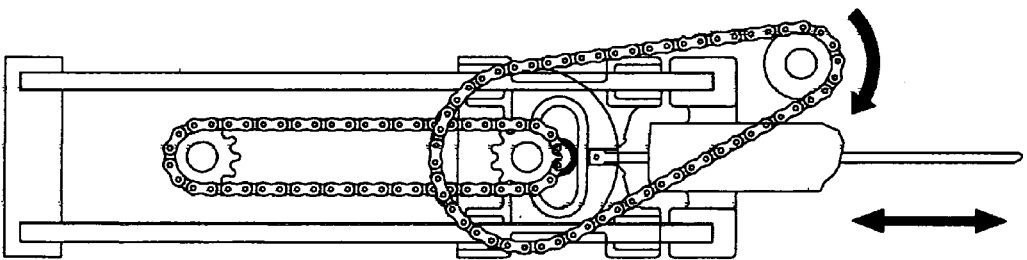
Figure 2A:
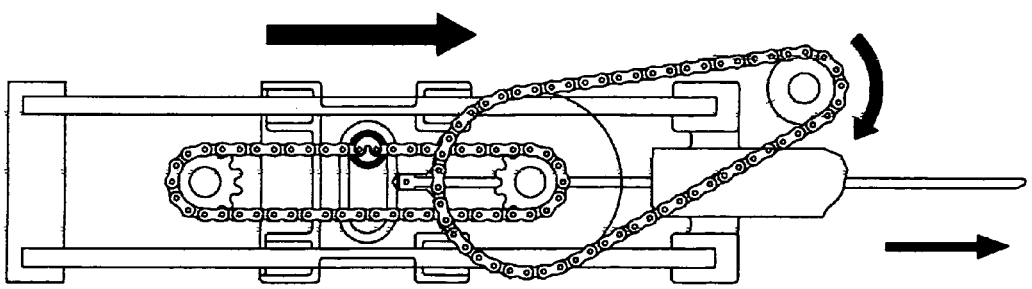

The overall purpose of this invention is to increase the amount of liquid or gas pumped or otherwise to increase the amount of work performed by the common windmill. The improved drive mechanism presented herein improves the efficiency of the power cycle by transitioning to the full upstroke with only a minimal dwell on either end of the stroke for transition to movement in the opposite direction. Additionally, full mechanical force can be applied equally on both the full upstroke and the full down stroke. The result is the ability to put to useful work a significantly higher amount of energy on the up stroke and an equally important advantage of being able to provide full mechanical force on the down stroke as well. This is not possible with the traditional windmill gearbox design. Ultimately, more work can be performed and with the inherent balance of forces applicable by this design, more useful work can be done at lower wind speeds than by the designs currently in use.

Referring to FIG. 1, the various components of the mechanism are shown in the drawing. The movement of the wind causes the wind wheel attached to the wind wheel to rotate which causes the two SMALL REDUCTION SPROCKETS to move the two DRIVE CHAINS. The DRIVE CHAINS cause the two LARGE REDUCTION SPROCKETS to rotate. The rotation of the two LARGE REDUCTION SPROCKETS causes the FORCE CHAIN DRIVE SPROCKETS to rotate which causes the movement of the two FORCE CHAINS.

The timing and connection of the twin chains and sprockets provides for balanced loading of all components and for the provision of uniform force for the application of work. The movement of the two FORCE CHAINS causes the movement of the CHAIN PIN, which is firmly connected to both FORCE CHAINS. This movement of the CHAIN PIN causes the movement of the captive slide through the BEARING in the slot located within the SLIDE. As the chain pin moves downward, as is shown in VIEW "A" of FIG. 2, it causes the captive SLIDE to move downward. The PUMP ROD is connected to the SLIDE and is caused to be moved an equal distance in the same direction as the SLIDE moves. It is the movement of this PUMP ROD that causes the pump to operate and perform useful work.

As the CHAIN PIN nears the bottom of its stroke, it begins to decelerate the velocity of the SLIDE, eventually bringing it to a momentary stop as shown in VIEW "B" of SHEET TWO. Continued application of force to the movement of the force chain then causes the CHAIN PIN and the captive SLIDE to begin acceleration in the opposite direction reaching full velocity at the point where the FORCE CHAIN moves in a straight direction. The continued movement of the FORCE CHAIN continues to move the CHAIN PIN and the captive SLIDE as shown in VIEW "C" of SHEET TWO. Upon reaching the end of the straight movement of the FORCE CHAIN, the SLIDE begins deceleration until it ceases movement just prior to reversing direction as shown in VIEW "D" of SHEET TWO. Continued application of force to the movement of the force chain then causes the CHAIN PIN and the captive SLIDE to begin acceleration in the opposite direction reaching full velocity at the point where the FORCE CHAIN moves in a straight direction and the CHAIN PIN and the SLIDE continue to move to the point of origin where the above described process continues as long as there is sufficient force to continue movement and useful work.

Figure 3:
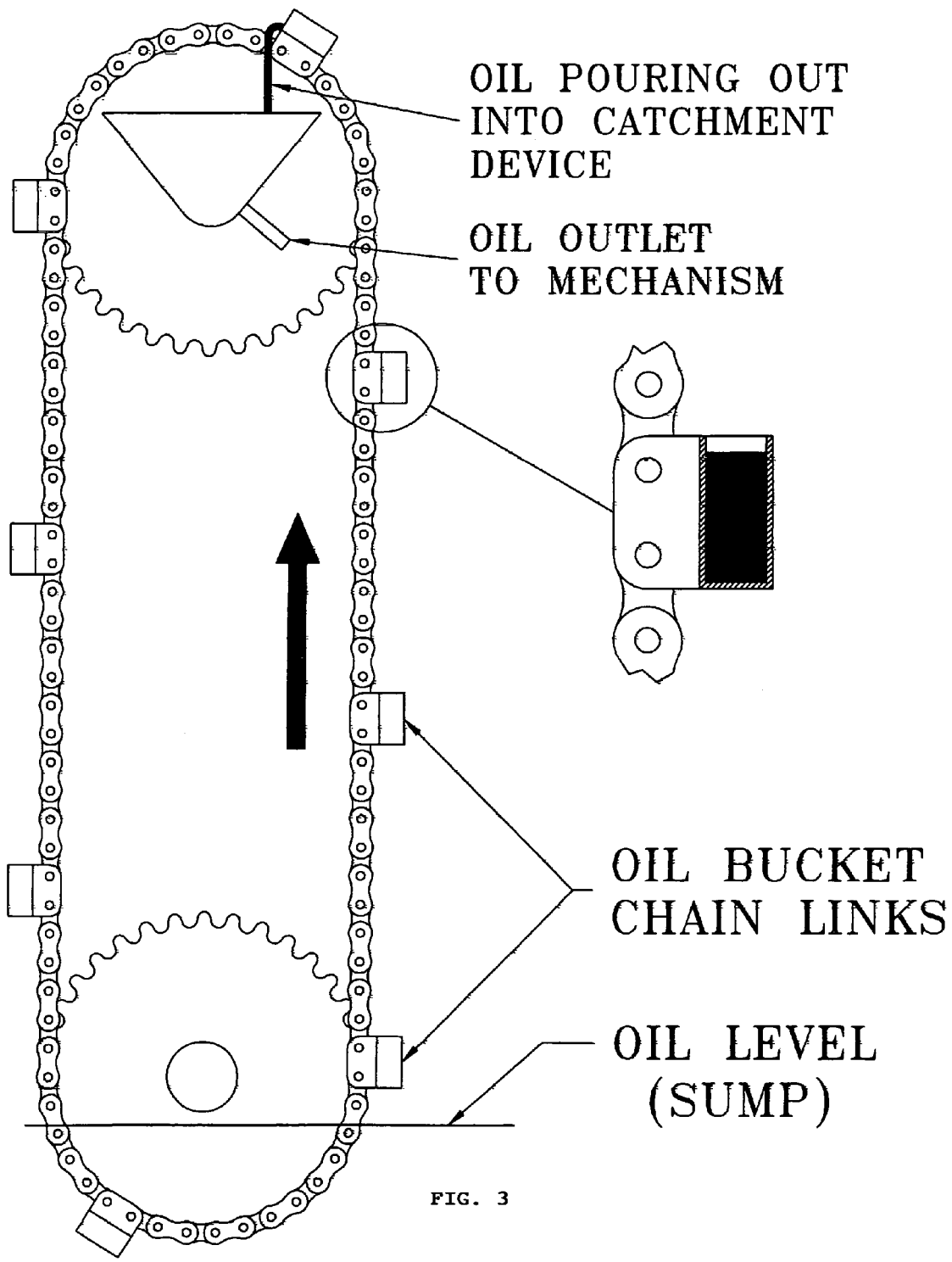
FIG. 3 shows a further improvement feature for the drive mechanism.

Referring to FIG. 3, another feature of the improved design uses a new high reliability OIL BUCKET CHAIN LINK lubrication system that floods the entire mechanism with abundant oil. This method avoids the problems found with traditional pumps regarding loss of priming, seals, wear, clogging and increase and decrease of viscosity caused by temperature change. This mechanism is shown on SHEET THREE. The rotation of a chain sprocket causes the chain to immerse its OIL BUCKET CHAIN LINKS below the surface of the oil in the oil SUMP. As the OIL BUCKET CHAIN LINKS reverse direction and begin to rise, they fill with oil, which is then carried up to the discharge point where it is poured out into the CATCHMENT DEVICE. The oil can then be easily directed to the parts of the mechanism requiring lubrication.

It is understood that many modifications and variations may be devised given the above description of the principles of the invention. It is intended that all such modifications and variations be considered as within the spirit and scope of this invention, as defined in the following claims.

What is claimed is:

1. An improved drive mechanism for a windmill comprising:
    (a) a drive chain driven into movement by a wind wheel shaft driven into rotation by wind movement against a wind wheel;
    (b) a drive chain sprocket driven by the drive chain and coupled to a force chain sprocket to correspondingly drive a force chain;
    (c) a chain pin coupled at one position to the force chain and also coupled to a captive slide; and
    (d) a pump rod connected to the slide and driven an equal distance in each direction by the driven slide in order to convert full mechanical force equally on both the full upstroke and the full downstroke of the pump rod.

2. A high reliability oil bucket chain link lubrication system used to flood the entire chain mechanism with abundant oil.

* * * * *